(12) United States Patent
Amonou et al.

(10) Patent No.: US 8,422,805 B2
(45) Date of Patent: Apr. 16, 2013

(54) DEVICE AND METHOD FOR SCALABLE ENCODING AND DECODING OF IMAGE DATA FLOW AND CORRESPONDING SIGNAL AND COMPUTER PROGRAM

(75) Inventors: Isabelle Amonou, Thorigne Fouillard (FR); Stephane Pateux, Rennes (FR); Sylvain Kervadec, Sens de Bretagne (FR); Nathalie Cammas, Sens de Bretagne (FR)

(73) Assignee: France Telecom, Paris (FR)

( * ) Notice: Subject to any disclaimer, the term of this patent is extended or adjusted under 35 U.S.C. 154(b) by 796 days.

(21) Appl. No.: 12/373,286

(22) PCT Filed: Jul. 6, 2007

(86) PCT No.: PCT/FR2007/051615
§ 371 (c)(1),
(2), (4) Date: Sep. 30, 2009

(87) PCT Pub. No.: WO2008/007006
PCT Pub. Date: Jan. 17, 2008

(65) Prior Publication Data
US 2010/0322529 A1  Dec. 23, 2010

(30) Foreign Application Priority Data

Jul. 10, 2006  (FR) .................................. 06 06272

(51) Int. Cl.
*G06K 9/36* (2006.01)
(52) U.S. Cl.
USPC ........... 382/235; 382/232; 382/233; 382/236; 382/250; 382/251
(58) Field of Classification Search ............... 382/232, 382/233, 235, 236, 250–251, 253; 348/400.1, 348/401.1, 402.1, 405.1, 408.1, 409, 410.1, 348/413.1
See application file for complete search history.

(56) References Cited

U.S. PATENT DOCUMENTS

| | | | | |
|---|---|---|---|---|
| 8,184,153 B2 * | 5/2012 | Kang et al. | ..................... | 348/135 |
| 2006/0233247 A1 * | 10/2006 | Visharam et al. | ........ | 375/240.12 |
| 2007/0230568 A1 * | 10/2007 | Eleftheriadis et al. | ..... | 375/240.1 |

OTHER PUBLICATIONS

Schwarz et al., "Constrained Inter-Layer Prediction for Single-Loop Decoding in Spatial Scalability", IEEE International Conference, Sep. 2005, pp. 870-873.

(Continued)

*Primary Examiner* — Ali Bayat
(74) *Attorney, Agent, or Firm* — Knobbe Martens Olson & Bear LLP

(57) ABSTRACT

A method of coding an image or a sequence of images generating a flow of data in the form of groups of blocks, at least one group of blocks containing image blocks having a resolution and a quality level of identical quantification, the method including the following steps for the at least one group of blocks, of a) a first coding so that each block of the at least one group of blocks has at least one associated parameter that is given a first value, and b) a second coding for giving the associated parameter for at least one block of the at least one group of blocks a second value, so that for the at least one block, the first and second values given for the parameter can be combined during decoding to provide a value assigned to the parameter.

9 Claims, 4 Drawing Sheets

OTHER PUBLICATIONS

Schwarz et al., "Independent parsing of spatial and CGS layers", JVT-S069, Apr. 2006.

Mathew et al., "Discardable bits and Multi-layer RD estimation for Single loop decoding", JVT-R050rl, Jan. 2006.

Wang et al., "On discardable lower layer adaptations", JVTS039, Apr. 2006.

Reichel et al., "Joint Scalable Video Model JSVM-6", JVT-S202, Apr. 2006.

* cited by examiner

DEVICE AND METHOD FOR SCALABLE ENCODING AND DECODING OF IMAGE DATA FLOW AND CORRESPONDING SIGNAL AND COMPUTER PROGRAM

This application is a 35 U.S.C. §371 National Stage entry of International Patent Application No. PCT/FR2007/051615, filed on Jul. 6, 2007, and claims priority to French Application No. FR 0606272, filed on Jul. 10, 2006, both of which are hereby incorporated by reference in their entireties.

The field of the invention is that of encoding and decoding images or sequences of video images. More precisely, the invention relates to a technique of encoding and decoding scalable images, that is to say having adaptable quality and variable space-time resolution.

Many data transmission systems are at present heterogeneous, in the sense that they serve a plurality of clients having very diverse types of access to the data. Thus the world-wide Internet system, for example, is accessible equally well from a terminal of the personal computer (PC) type as from a radio-telephone. More generally, the bandwidth for access to the network, the processing capabilities of the client terminals and the size of their screens vary greatly from one user to another. Thus a first client can for example access the Internet system from a powerful PC and have an ADSL (Asymmetric Digital Subscriber Line) data rate of 1024 kbits/s whilst a second client seeks to access the same data at the same time from a terminal of the PDA (Personal Digital Assistant) type connected to a modem having a low data rate.

It is therefore necessary to offer these various users a data flow which is adapted, both in terms of data rate and of image resolution, to their requirements. This necessity is imposed more widely for all applications accessible to clients having very diverse access and processing capabilities, and in particular the following applications:
  VOD (Video On Demand), accessible to radio-communication terminals of the UMTS (Universal Mobile Telecommunication Service) type, to PCs or to television terminals having ADSL access, etc.;
  session mobility (for example taking up a video session on a PDA that was started on a television set, or on a UMTS mobile, of a session started on GPRS (General Packet Radio Service));
  session continuity (in a context of sharing the bandwidth with a new application);
  high definition television, in which a single video encoding must make it possible to equally well serve clients having a standard definition SD terminal and clients having a high definition HD terminal;
  videoconferencing, in which a single encoding must meet the requirements of clients having UMTS access and Internet access;
  etc.

In order to meet these different requirements, scalable image encoding algorithms which allow adaptable quality and variable space-time resolution have been developed. The encoder generates a compressed flow having a hierarchical structure of layers, in which each of the layers is nested in a layer of higher level. For example, a first data layer carries a flow at 256 kbits/s, which will be able to be decoded by a terminal of the PDA type, and a second complementary data layer carries a flow of resolution higher than 256 kbits/s which will be able to be decoded, in addition to the first one, by a more powerful terminal of the PC type. The data rate necessary for the transport of these two nested layers is, in this example, 512 kbits/s.

Some of these scalable video encoding algorithms are at present in the process of being adopted by the MPEG (Moving Picture Expert Group) standard, in the context of the MPEG VIDEO working group.

The first generation of these scalable algorithms (cf. the MPEG-4 work, in particular with the technologies of the FGS (Fine Grain Scalability) type) is not being imposed because it is criticized for being less than optimal in terms of compression.

More recently, new algorithms have been imposed in order to respond to this efficiency problem. They are at present in the process of adoption by the MPEG-4 AVC standard, in the context of the joint JVT working group between the ISO and the IEC: SVC will be amendment 3 of the AVC standard (ISO/IEC 14496-10 Amdt3) (Scalable Video Coding).

The model which has recently been used by SVC is based on a scalable encoder with inter-layer prediction and temporal decomposition by bidirectional prediction (B images). This new standard is capable of providing medium grain flows scalable in the time and space dimensions and in quantification quality.

The decoder corresponding to the standard is described in the document "Joint Draft 6", J. Reichel, M. Wien, H. Schwarz, JVT-S202, 2006.

The main features of this solution are as follows:
  pyramid solution with sub-sampling of the input components;
  temporal decomposition by B images at each level,
  encoding of successive layers in CGS (Coarse Grain Scalability) mode or in FGS (Fine Grain Scalability) mode.

The encoder is shown diagrammatically in FIG. 1. It comprises two modes:
  a) the FGS 1, 1', 1" mode or encoding by progressive quantification making it possible to achieve a granularity known as "average" (of the order of 10%). The encoder chains the following steps:
    encoding at 2 of a low resolution version of the video sequence (the basic quantification level of this low resolution is AVC compatible).
    encoding of the higher levels by prediction starting from the preceding level reconstructed and over-sampled and encoding of the residues in the form of:
      ○ a basic level
      ○ one or more raised levels obtained by multi-pass encoding of bit planes (hereafter: FGS). The prediction residue is encoded up to a data rate $R\_ri\_max$ which corresponds to the maximum data rate decodable for the ri resolution.
  b) GCS mode or encoding in layers making it possible to achieve a so-called coarse scalability (of the order of 25%). The encoder chains the following steps:
    The basic level is encoded with a quality 0, (layer 0, with QP0)
    la difference between the layers is calculated and this difference is encoded (entropic encoding).

An SVC flow is constituted by a set of information packets, These various information packets (NAL unit) can be hierarchically grouped as a:
  video sequence: set of information packets representing a video sequence (not necessarily corresponding to the whole of the video flow). In the first packets, there are found, in particular, overall information packets relating to the sequence: packets of the SPS (Sequence Parameter Set) type, and also information packets relating to the different types of images present: packets of the PPS (Picture Parameter Set) type Access Unit: set of information corresponding to a moment in time. In it are found information packets of the information message type (SEI—Supplemental Enhancement Information), or data Slice: set of information encoded within an NAL unit. A slice groups a set of macroblocks of an image for a representation level or layer (spatial representation level for example). A slice will refer to a group of groups of blocks hereafter.

Macroblock: set of information present in a group of blocks. A macroblock is constituted by four 8×8 luminance blocks and by two 8×8 chrominance blocks (red chrominance, blue chrominance) for the 4:2:0 colour format. A group of blocks will be called a macroblock hereafter.

Block: information set relating to an image block of size 8×8 or 4×4.

It should be noted that, in the rest of this text, unless the context specifies otherwise, the term "group of blocks" indifferently denotes a macroblock or a "slice".

The SVC flow is organized in Access Units (AU) each corresponding to an instant (temporal) and comprising one or more access units for the network (packet) or NALU (Network Abstraction Layer Units).

Each NALU, FIG. 2, is associated with an image resulting from the space-time decomposition Ti, a spatial resolution level Sj, and an SNR quantification quality level Ek. This structuring in NALUs then makes it possible to carry out an adaptation of data rate and/or space-time resolution by eliminating the spatial resolution NALUs that are too big, or the time-frequency ones that are too big or the quantification ones that are too big.

Each NALU encapsulates an image portion, or "slice", the image slice being able to correspond to all or part of the image. As mentioned above, a slice is a set of macroblocks contained in an image. It is possible to find several slices in one image (typically, in order to limit the size the NALUs, to limit the impact of a packet loss, to carry out an adaptive encoding by image region, etc.)

Each NALU specific to SVC comprises an AVC header byte and two SVC header bytes* containing the fields (P,D,T,Q) (Priority_id, Dependency_id, Temporal_level, Quality_level). These fields can be used for carrying out an adaptation in spatial and/or frequency-time resolution, and/or quality using only the NALUs having a sufficiently high field level (P,D,T,Q).

The "Priority_id" field indicates a priority level of a NALU that can be used to guide a quality adaptation.

The "Dependency_id" field makes it possible to know the spatial resolution level of a hierarchical encoding layer. This level can also control an SNR quality raising level or temporal raising level in the context of layered encoding, that is to say for a discrete number of operating points.

The "Temporal_level" field makes it possible to indicate the temporal level linked with the image frequency.

The "Quality_level" field makes it possible to indicate the progressive quantification level, and therefore to control the data rate/quality and/or the complexity.

Each NALU also comprises in the header a "discardable_flag" field which indicates if the unit must be taken into account for the decoding of the current level only or for the decoding of the current level and of the higher level.

A scalable flow is divided into layers. Each layer is identified by the syntax element called "dependency_id". For each layer, a basic level is encoded in non-progressive mode with an initial quantification pitch QP0. This basic level is identified within the layer by the syntax element called the quality level (quality_level in the standard) QL0 (that is to say QL=0).

The basic level QL0 of a layer "layer 1", FIG. 3, can be predicted:
either by the basic level QL0 of a lower layer "layer 0". This in particular is the case in the non-progressive mode since in the current state of the standard it is not permitted to have several quality levels (QL) in a same layer in CGS
or by a level QLi (that is to say QL=i) of the lower layer (i>=0) in progressive mode or in non-progressive mode CGS assuming several QL levels in CGS.

This prediction is called the "inter-layer" prediction.

Within each layer, raised levels QLi of the basic level QL0 can be encoded, these raised levels are identified by their quality level QL. The standard provides for these raised levels to be encoded in progressive refinement mode—FGS, even though technically it is also possible to encode the raised level in non-progressive mode CGS. These prediction levels are encoded using an inter-layer prediction derived from the preceding level QL0 (basic level or raised level).

In so-called "single loop" mode (the one currently used for the SVC standard) the image blocks of a level N used for the prediction of the higher level (N+1) are not movement compensated. In other words, they do not depend on the other surrounding image blocks.

The movement compensation is therefore carried out by the decoder at the last level. The residual data used for the prediction are then accumulated in macroblocks.

For the macroblocks which do not use the prediction, the corresponding blocks of the basic level are not necessary. Thus a whole set of level N blocks is not necessary for the decoding of the level (N+1). These blocks can therefore be omitted.

At present, the data useful for the prediction of the higher level and those which are not useful are encoded in the same image slice. It is not therefore possible to separate them immediately.

In the prior art there are several techniques for separation in several slices of information of a quality level of a layer into information that is useful (first slice) and not useful (second slice) for the prediction of the higher layer. These methods have several problems:
the proposed solutions mostly involve profound modifications of the syntax of the AVC/SVC standard,
they propose a binary processing of the information of the (macro)blocks: the macroblocks are included or excluded from one of the slices.

Documents illustrating the known techniques are as follows:
"independent parsing of spatial and CGS layers", Schwarz et al, JVT-S069, April 2006, Geneva (HHI),
"Discardable bits and Multi-layer RD estimation for Single loop decoding", Mathew et al., JVT-R050r1, January 2006, Bangkok,
"On discardable lower layer adaptations", Wang et al, JVTS039, April 2006, Geneva.

The purpose of the invention is to propose a method for encoding data representative of a quality level of a data layer in at least two passes which can be combined. It is an objective of the invention to overcome the drawbacks mentioned above by proposing a more flexible mechanism of distribution of encoding data in different slices whilst complying with the syntax of the AVC/SVC standard.

The invention thus proposes a method for encoding an image or a sequence of images generating a data flow in the form of groups of blocks, at least one group of blocks grouping image blocks having a resolution and a quality level of identical quantification, characterized in that said method comprises at least the following steps, for the at least one group of blocks, of a. a first encoding adapted so that each block of the at least one group of blocks has at least one associated parameter that is given a first value, and b. a second encoding adapted for giving said associated parameter for at least one block of said at least one group of blocks a second value, so that for said at least one block, the first and second values given for said parameter can be combined during decoding in order to provide a value assigned to said parameter.

The advantages of such a method are:

to have a finer data rate granularity. During a slice encoding of the EI, EP, EB (non-progressive mode) type, the granularity is limited to that of the slice. The sub-passes linked with two encodings then make it possible to have a finer granularity, to have better compression efficiency. For example, it is advantageous to encode a block in two partitioning modes which are added together (i.e. low frequencies in 16×16 mode and solely high frequency details in one of the 4×4 blocks).

According to particular embodiments of the invention, the combination of the values carried out during decoding corresponds to an addition of the latter or to a substitution of the value given by the first encoding by the value given by the second encoding.

According to another embodiment, as the groups of blocks of the data flow have a hierarchic structure of data layers nested in n successive levels, where n is an integer, each of said layers corresponding to a predetermined resolution and range of encoding quality levels of said groups of blocks so that the resolution and/or the encoding quality level increases as the order of layers increases, at least one layer n+1 is encoded by prediction from the lower layer n, the encoding by prediction of the higher layer using only the values given by the first encoding.

In a context of inter-layer prediction, this makes it possible to eliminate the transmission of information which is not necessary for encoding information of the higher layer when it is desired to decode only that layer.

According to yet another embodiment, it furthermore comprises at least a third encoding step adapted for giving at least a third value to the associated parameter so that, for said at least one block, the first, second and third values given for said parameter can be combined during decoding in order to provide a value assigned to said parameter.

This makes it possible to simply separate the information into several sub-passes (at least two) in order, for example, to carry out an adaptive inter-layer prediction using the existing SVC syntax again in the context of a "main" profile, providing if necessary a minimum quality level for the reconstruction of the basic level and/or providing if necessary the best prediction for the higher level.

The encoding becomes more efficient in compression by simulating, for example, a multi-layer encoding optimizing the encoding of the higher level.

Encoding in several passes also allows a finer granularity data rate via sub-passes within a quality level of a layer as well as increased compatibility with the existing stock of decoders.

The invention also relates to a method of decoding an image or a sequence of images originating from a data flow in the form of groups of blocks, at least one group of blocks grouping image blocks having a resolution and a quality level of identical quantification, said flow having been generated by the previously described encoding method, characterized in that said decoding method comprises at least the following steps, for the at least one group of blocks, of a. a first decoding of the values given by the first encoding for the associated parameter for each block of said group of blocks, and b. a second decoding of the values given by the second encoding for at least one block of said group of blocks, so that for said at least one block of said group of blocks, the value assigned for this parameter is a combination of the values of the latter decoded by the first and second decoding.

The invention also proposes a device for encoding an image or a sequence of images generating a data flow in the form of groups of blocks, at least one group of blocks grouping image blocks having a resolution and a quality level of identical quantification, characterized in that said device comprises at least the means, for the at least one group of blocks, of a. a first encoding so that each block of the at least one group of blocks has at least one associated parameter that is given a value, and b. a second encoding for giving a value to said associated parameter for at least one block of said at least one group of blocks, so that for said at least one block, the first and second values given for said parameter can be combined during decoding in order to provide a value assigned to said parameter.

The invention also proposes a device for decoding an image or a sequence of images originating from a data flow in the form of groups of blocks, at least one group of blocks grouping image blocks having a resolution and a quality level of identical quantification, said flow having been generated by the encoding method, characterized in that said device comprises at least the means, for the at least one group of blocks, of a. a first decoding of the values given by the first encoding for the first associated parameter for each block of said group of blocks, and b. a second decoding of the values given by the second encoding for at least one block of said group of blocks, so that the value assigned to each block of said group of blocks for this parameter is a combination of the values decoded for the latter by the first and second decoding.

The invention also proposes a signal for transmitting a data flow encoded by the preceding method.

The latter is such that a group of blocks header furthermore comprises information indicating the type of combination to be carried out between the values given by the different encoding steps.

The invention also proposes a computer program product that can be downloaded from a communications network and/or recorded on a medium that can be read by a computer and/or that can be executed by a processor, characterized in that it comprises program code instructions for the implementation of the preceding encoding method.

The invention will be better understood in the light of the description and the drawings in which.

Figure 1:
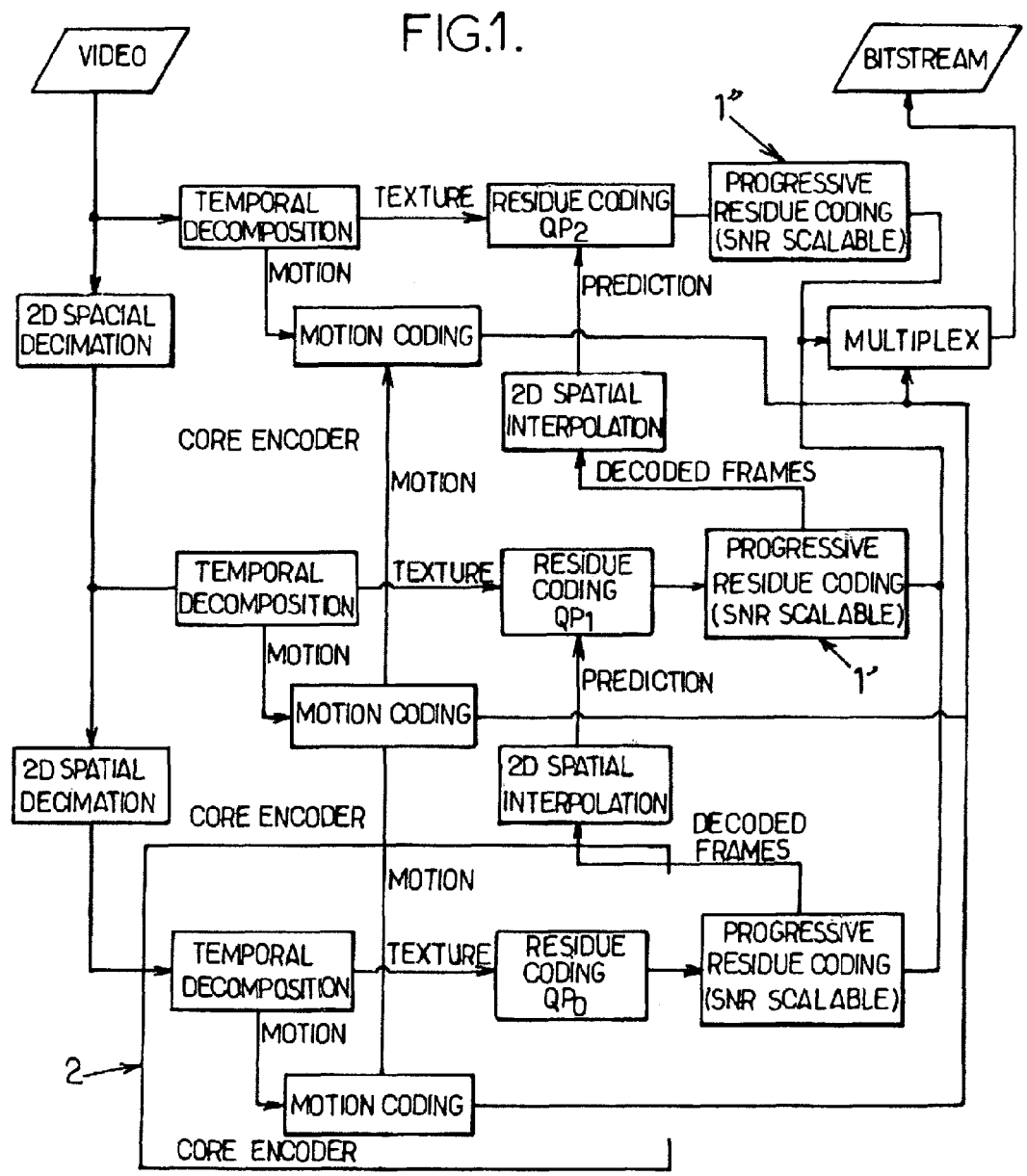
FIG. 1 is a block diagram of an encoder according to the SVC standard.
Figure 2:
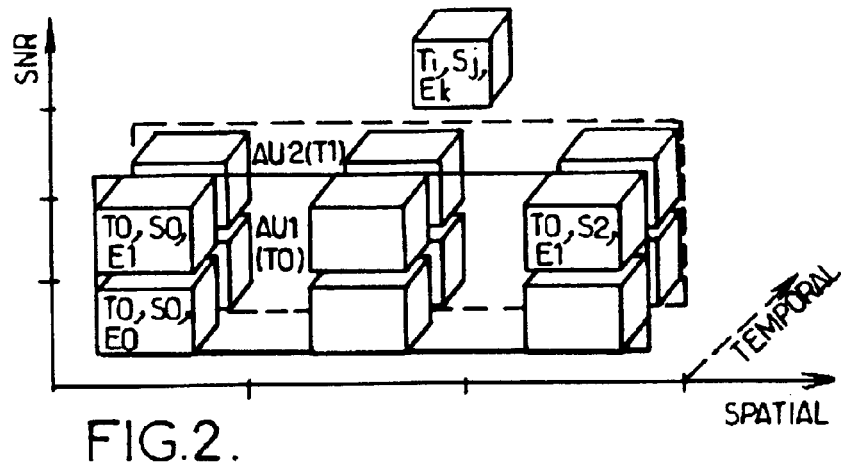
FIG. 2 is a symbolic representation of the flow encoded according to the SVC standard as broken down into NALU.
Figure 3:
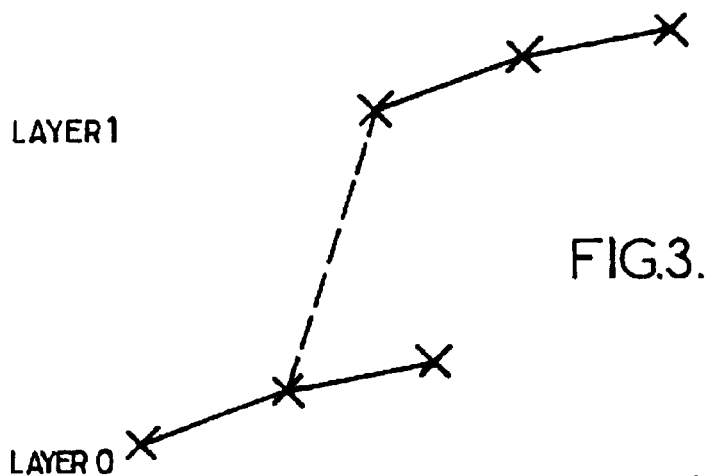
FIG. 3 is a diagrammatic view of the relationships between the inter-layer prediction and the intra-layer prediction in the draft SVC standard.
Figure 4:
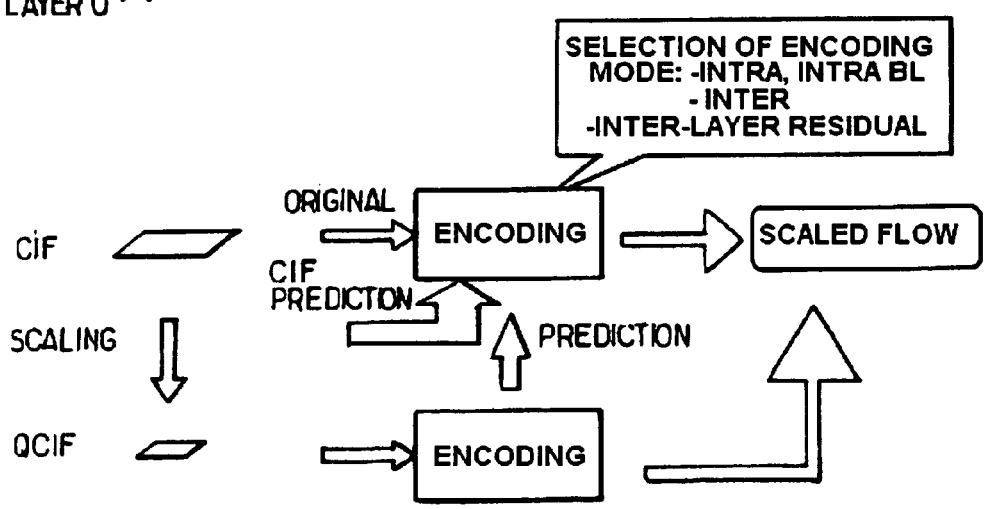
FIG. 4 is a diagrammatic representation of the encoding flows in the SVC standard.

This description is given in the context of the encoding of information using a slice of I, P, B, EI, EP, EB (i.e. non-progressive slice) type for a quality level (quality level) of given quantification of the SVC encoder.

The encoding of this slice is carried out in several sub-passes, each sub-pass raising the quality of the preceding sub-pass, whilst remaining at the same quantification of quality level "quality_level".

Each sub-pass is encoded, preferably, as a normal AVC/SVC pass. The information obtained is then merged with the information of the preceding pass.

Each raised sub-pass, that is to say not corresponding to the first sub-pass of the slice in question, is encoded as a slice of EI, EP or EB type. For each macroblock, the way in which the newly encoded information refines the previously encoded information (for example: addition or replacement) is indicated.

The sub-passes are not therefore fragments of CGS passes as are the FGS fragments in FGS mode, since they do not necessarily represent unconnected information between the different sub-passes.

There are many advantages of such and approach The sub-passes approach makes it possible:
- to eliminate, in an inter-layer prediction context, the transmission of information which is not necessary for the encoding of information of the higher layer when it is desired to encode only that layer,
- to have a finer data rate granularity. During an encoding by slice of the EI, EP, EB (non-progressive mode), the granularity is limited to that of the slice. The sub-passes therefore make it possible to have a finer granularity.
- to have a better compression efficiency. It can, for example, be advantageous to encode a block in two partitioning modes that will be added to each other (i.e. low frequencies in 16×16 mode, and only the high frequency details in one of the 4×4 blocks).

Each encoding pass results in a set of data that can be combined. Each encoding pass is inserted in a slice in the sense of the SVC syntax.

Thus, in the case of two sub-passes, the macroblocks of the image (whose medium corresponds to the slice) can belong partially to the first and to the second sub-pass.

This division of data into two sub-passes then makes it possible for the decoder to carry out a combination of the information of the two sub-passes:
- addition of data,
- concatenation of data (in the DCT domain for example),
- overwriting data,
- etc.

This results in the encoding in several passes of information present within a slice by using an encoding with several slices having the same position. The information of the two slices will be combined (according to a method optionally provided in the decoder).

This makes it possible to simply separate the information into several sub-passes (at least two) in order to produce, for example, an adaptive inter-layer prediction using the existing syntax of SVC again in the context of a "main" profile, if necessary providing a minimum quality level for the reconstruction of the basic level and/or providing if necessary the best prediction for the higher level.

The encoding becomes more efficient in compression by simulating, for example, a multi-layer encoding optimizing the encoding of the higher level.

Encoding in several passes also allows a finer data rate granularity via sub-passes within a quality level of a layer as well as compatibility with the existing stock of decoders.

In a simple implementation of this encoding with two sub-passes in SVC, in the context of ILP, the first sub-pass is considered as "non-discardable" in the sense of the SVC syntax: the flag is not shown. It contains all of the information which will be decoded by a decoder which works at a higher resolution than that of the current level.

The second sub-pass is considered as "discardable" in the sense of the SVC syntax (the "discardable" flag is shown). It contains all of the information which will be decoded only by a decoder which works at the resolution of the current layer. It can therefore be omitted by a decoder working at a higher resolution.

Macroblock by macroblock, it is therefore possible to envisage carrying out a simple addition of the residual data of the two macroblocks or to overwrite the data of the first sub-pass with that of the second, etc.

Figure 5:
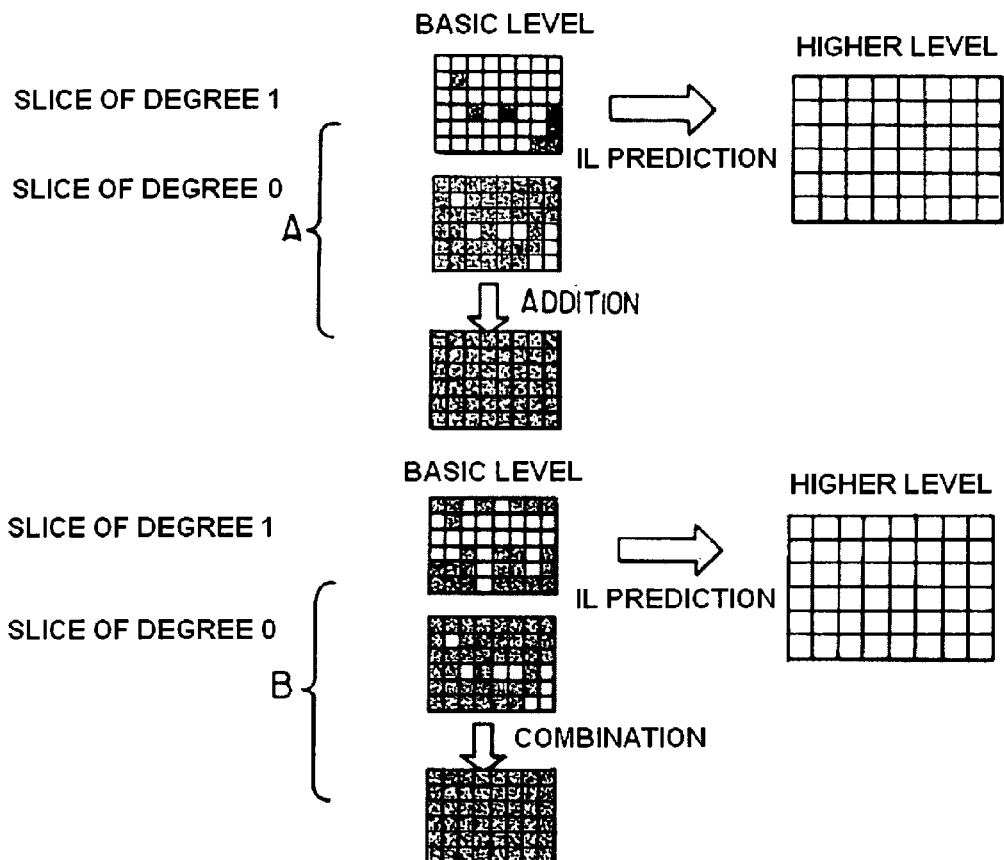
FIG. 5 is a diagrammatic view of an embodiment of the invention in an inter-layer encoding compared with the prior art.

FIG. 5 is a diagrammatic representation of the invention applied to inter-layer encoding. In part A, a macroblock is encoded (grey blocks) or is not encoded (white blocks). This corresponds to the prior art. In part B the encoding sub-passes approach is shown: a macroblock can be partially encoded (white blocks) or totally encoded (grey blocks).

The method for encoding an image or a sequence of images generates a data flow in the form of groups of blocks, at least one group of blocks grouping image blocks having a resolution and a quality level of identical quantification. The method comprises at least the following steps, for the at least one group of blocks, of
a. a first encoding adapted so that each block of the at least one group of blocks has at least one associated parameter that is given a first value, and
b. a second encoding adapted for giving a second value to this associated parameter for at least one block of the at least one group of blocks,
so that for said at least one block, the first and second values given for said parameter can be combined during decoding in order to provide a value assigned to said parameter.

Each encoding step is also called a "sub-pass".

Several modes are envisaged.

A first mode consists in the addition of the values given during sub-passes.

A second mode consists in the adaptive combination of the values given during sub-passes by addition or substitution with signalling of the type of combination at the level of blocks, groups of blocks (macroblocks) or groups of groups of blocks (Slice).

A third mode consists in the definition, in an additive mode, of a coefficient to be reached for the sub-pass (concatenation of data). The end of block signal (EOB) therefore becomes optional.

The combination information can be carried by the slice header, the macroblock header or by the PPS or by the SPS.

The procedure is preferably as follows:

In the context of inter-layer prediction, two information layers N and (N+1) are encoded. The quantification level information (coefficients) L of layer N are distributed in the slices 1 (first pass) and 2 (second pass).

In slice 1 are placed the coefficients of the macroblocks calculated during a first encoding phase, which will be used for the prediction of level N+1. They can be blank data (macroblock skip) for at least a portion of the data (texture and/or movement) or "better" coefficients according to a quality criterion. In this latter case, they are preferably coefficients of the sub-sampled blocks of level N+1. They can also be coefficients originating from level N providing the best prediction of level N+1 (calculated in the sense of a rate distortion criterion, for example) or all the coefficients of the block at level N or those which give a minimal quality on the basic level (it is a matter, for example, of providing a minimal AVC quality level).

For this slice the useful (non-discardable) data indicator is set at 0. It is noted that if they are AVC data, this step will be omitted a priori.

The coefficients of the second encoding pass are placed in slice 2. They are, for example, coefficients which will not be used for the prediction of level N+1 (DS=1). They can be blank data (macroblock skip) or a complement of the data of the macroblock in the same position in slice 1 or "better" coefficients according to an SNR quality criterion for the encoding of level N.

For this slice the useful (discardable) data indicator is set at 1.

A combination mode (addition, replacement or combination, etc.) is encoded for this slice 2. This mode is preferably placed in the header of each macroblock, even though it can also be placed in the header of the slice (thus indicating a same type of operation for all of the macroblocks in the slice), or in the SPS, etc.

In the multi-pass context, without the inter-layer prediction concept, the encoding of a single information layer N is considered. The information (coefficients) of the quality level of quantification L for a layer N are distributed in K slices for at least one access unit AU:

The first sub-pass consists in processing slice 1. In the latter are placed the coefficients of the macroblocks calculated during the first encoding sub-pass. These are preferably the "better" coefficients for the pass according to a quality criterion. For example, all possible combinations of block sizes and associated DCT (16×16, 8×8, 4×4) of the macroblock are put into competition and the best combination from the data rate-distortion for a certain quality point of view is retained.

The $i^{th}$ sub-pass consists in the processing of slice i, 2<i<K. The coefficients of the $i^{th}$ encoding phase are placed in slice i. These are blank data if a sufficient quality is reached or a complement of the data of the macroblock in the same position as in slice 1. The complement preferably refines the data on a different medium. For example, DCT complement on 4×4 blocks when the encoding is carried out on 8×8 blocks in the preceding slice.

A combination mode (addition, replacement or combination or refinement of the distribution, etc) is encoded. The pass number is also encoded. The mode is preferably placed in the header of each macroblock, even though it can also be placed in the header of the slice (thus indicating a same type of operation for all the macroblocks of the slice), or in the SPS, etc. The pass number is preferably placed in the header of each slice.

A particular embodiment will now be described.

Figure 6:
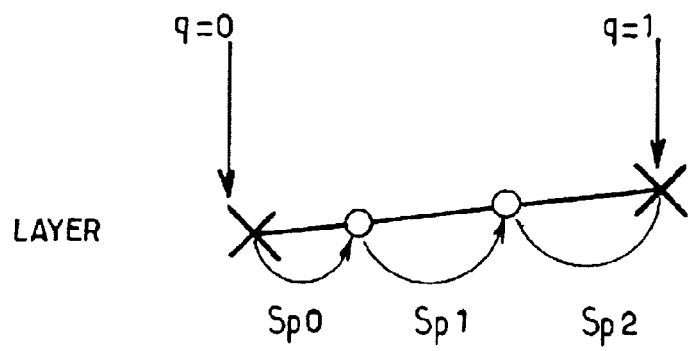
FIG. 6 is a diagrammatic representation of a mechanism of encoding by sub-passes of a raised quantification layer according to one embodiment of the invention.

FIG. 6 illustrates the principle of encoding a raised quantification level by the intermediary of sub-passes. The raised quantification level having the quality level (quality_level) 1 is encoded in several sub-passes sp0, sp1 and sp2. The encoding of a raised quantification level in sub-passes can be carried out on any raised quantification level, including the first level (still called the basic level and for which quality_level=0). Each sub-pass is thus encoded in the SVC context by an NAL unit.

In a variant, an NAL unit can contain at least one raised quantification sub-pass. In this variant, it can then be possible to carry out a truncation of an NAL unit encoded in CGS mode.

This sub-pass encoding of a raised quantification level is carried out for at least one data unit within a representation layer for at least one access unit AU.

The encoding of a raised quantification level is then as follows:
 establishment of the number of sub-passes used, and definition of the data to be encoded within different sub-passes,
 encoding loop of the different raised quantification sub-passes. For each sub-pass:
  encoding of the signalling information of the sub-pass.
  encoding of the data related to the current sub-pass.

The definition of the number of encoding sub-passes and of the data to be encoded within each sub-pass depends on the particular embodiment used. Different (and non-limiting) types of particular modes of definition of sub-passes will be illustrated hereafter.

In a favoured mode, the encoding of the signalling information of the raised quantification sub-pass consists in identifying the index of the quantification sub-pass (sub_quality_level_idx) and an indicator of the last sub-pass (last_sub_quality_level_flag). The syntax modifications for SVC are shown in Appendix 1. This signalling information is inserted in the header of the slices of SVC data.

It should be noted that these syntax modifications are proposed here as an indication. Some additional restrictions (in particular syntax restrictions depending on the sub-pass number, similarly to fragment number) can be adjusted for an efficient implementation.

In this mode, the encoding of the data related to each sub-pass is carried out in a way similar to SVC. All of the data of the blocks encoded in a group of groups of blocks (i.e. a slice in SVC terminology) are encoded. Thus, the encoding of the first sub-pass remains compatible with a basic decoder (for example an AVC decoder for the first sub-pass of the first layer representing an SVC flow, or even more generally, for a decoder implementing a low profile level).

Optionally, information of the type of combination of the information encoded within different sub-passes is defined.

The favoured embodiment of the invention is to consider that the information encoded within different sub-passes must be added together.

In a variant, it is possible to use the adaptive inter-layer prediction fields again for using a combination mode of the substitution type (the data of a sub-pass overwrites the data defined in the preceding sub-pass or sub-passes). This type of combination can be signalled at the level of each block, group of blocks or group of groups of blocks (favoured mode: at the level of the group of blocks or macroblock).

In another variant, the information encoded in a sub-pass is to be interpreted as coefficients completing the coefficients already encoded and are therefore to be concatenated with the list of coefficients already encoded in the preceding pass or passes. It should be noted that, because the encoding of the coefficients by zigzag scanning, a first sub-pass can encode a first group of coefficients in the order of progress and the second sub-pass then encodes a group of coefficients appearing thereafter in the order of progress.

One embodiment of the encoding in sub-passes for the inter-layer prediction will now be described.

In this embodiment, a raised quantification level is encoded in two sub-passes in order to define data called "useful" for the inter-layer prediction and data called "not useful".

Because of the use of an adaptive inter-layer prediction mode, during the encoding of a layer representing a higher level, it is indicated for each block if the information originating from the layer used for the prediction is or is not used. In the case of the non-use of the information associated with a block of the layer used for the prediction, this information will then be called "not useful". It can be ignored by a decoder working at a resolution higher than that of the prediction layer.

Figure 7:
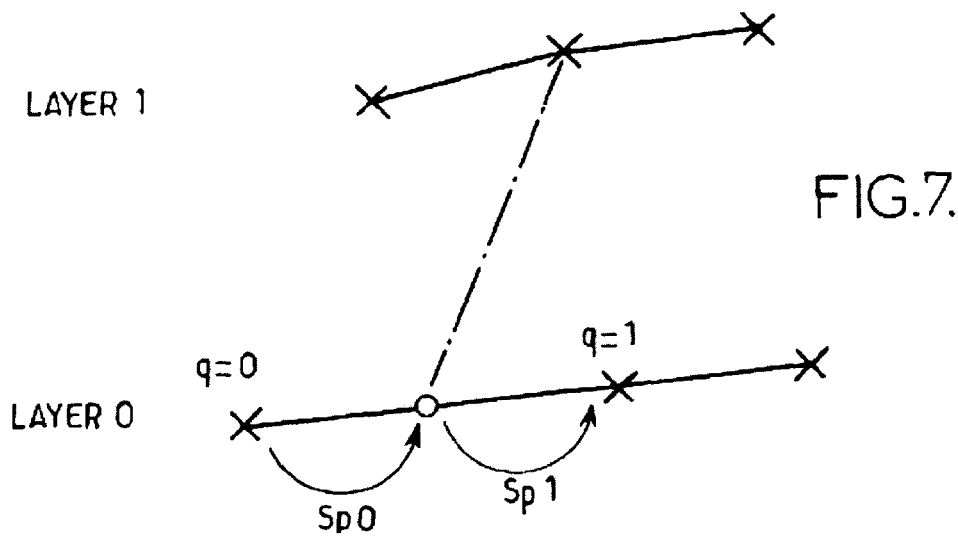
FIG. 7 is a diagrammatic representation of a mechanism of encoding by sub-passes in the case of an inter-layer prediction according to another embodiment of the invention.

FIG. 7 illustrates this embodiment. The information called "useful" is encoded in the sub-pass entitled "sp0". The information called "not useful" is encoded in the sub-pass entitled "sp1". Advantageously, the first sub-pass is then marked as "non-discardable", whereas the second sub-pass is marked as "discardable" (signalling carried out via the syntax element "DS_flag" defined in the header of each SVC NAL).

In a variant, the inter-layer prediction mechanism presently defined in SVC can be adapted to take account of the encoding sub-passes concept.

The syntax element "fragment_order_base" currently used to identify the fragment number of an FGS sub-pass used as a reference point for the inter-layer prediction, will then have to be interpreted as being the number of the sub-pass defining the reference point for the inter-layer prediction.

The new syntax element "sub_quality_level_idx" can be used for the same purpose in the case of a CGS NAL (non progressive).

It can be noted that, in the favoured embodiment described in this section, it is not necessary to describe which sub-pass defines the point of prediction because the syntax element "DS_flag" indicates if a data unit is used or not used for the inter-layer prediction.

In a preferred embodiment, the useful/not useful information partitioning is carried out block by block. If a block is considered useful, its information is encoded in the first sub-pass and subsequently a zero update value is encoded in the second sub-pass. If a block is considered not useful, minimal information is then encoded in the first sub-pass (typically a set of zero information values), and the remaining information is encoded in the second sub-pass.

In a variant, the minimal information encoded for the not useful blocks will be defined in order to achieve a minimal reconstruction quality during a decoding having only the first sub-pass (for example, by encoding only the movement information).

In a variant the partitioning of the useful/not useful information can be carried out by adaptive selection of the coefficients to be retained within a block (a selection carried out, for example, according to a compression efficiency criterion associated with the higher layer).

In a variant, the information called "useful" is defined by the intermediary of the information to be encoded in the higher layer (for example, by sub-sampling the information to be encoded in the higher level); the information encoded in the second sub-pass then corresponding to the information making it possible, following a combination with the information of the first sub-pass, to have a good reconstruction of the basic representation layer.

The sequence of this embodiment is therefore as follows:
definition of the information called useful for the inter-layer prediction,
encoding in a first raised quantification sub-pass of information called useful for the inter-layer prediction,
encoding the remaining information in a second raised quantification sub-pass.

This data distribution mechanism can be applied to any raised quantification level (including the basic level), and can be applied to several quantification levels simultaneously.

In a second embodiment, encoding in sub-passes is used to increase the data rate granularity fineness.

In this embodiment, an encoding in several raised quantification sub-layers is carried out for a raised quantification level in order to limit the data rate "skip" linked to this quantification level.

A preferred embodiment is to define for each sub-pass a minimal set of coefficients to be encoded. This minimal set of coefficients can be defined as being the coefficients included between two positions in the order of progress of the coefficients within blocks. This minimal set can also be defined via a minimal position to reach in the order of progress of the coefficients within each block. If the position has already been reached during a preceding encoding, then information is encoded indicating a zero raising for that block.

The position information to be reached can be signalled in the header of the encoding of a group of blocks, which can then make it possible not to encode end-of-block information in certain cases. In a variant, no position information is encoded, necessitating the encoding of a termination criterion for each block.

A variant of this embodiment is to initially define a set of values to be encoded for the raised quantification level in question. Subsequently, these various pieces of information are distributed according to a rate-distortion criterion through the various sub-passes. Typically, the information to be encoded within a block for a raised quantification level is defined via the minimizing of a criterion of the $R+\lambda_{QP(QL)}D$ type (QP(QL) corresponding to the raised level quantification parameter QL, R corresponding to the rate and D to the distortion. The distribution of this information within different sub-passes can then be carried out using intermediate points optimized from the rate-distortion point of view. With each pass there is associated a lagrangian by shifting the quantification pitch: $\lambda_{sp(i)}=I_{QP(QL)-\Delta QP(i)}$, then, for each sub-pass, there is defined what is the sub-set of coefficients to be retained for minimizing the rate-distortion compromise $R(sp(i))+\lambda_{sp(i)}D(sp(i))$.

Another embodiment is to use a different quantification pitch for at least two sub-passes of a quantification level. Typically, a quantification level is defined by using the quantification parameter QP of the preceding level and reducing it by 6 (i.e. which amounts to dividing the quantification pitch used by two). The intermediate sub-passes can then be associated with the use of intermediate quantification pitch.

In a third embodiment of encoding in sub-passes, the latter is used for increasing the compression efficiency.

In SVC, several modes of encoding residual information are available (4×4 transformation, 8×8 transformation), and a choice is made for each block in order to use the most suitable encoding mode. In certain situations, it can however be advantageous to use several encoding modes for a same information block to be encoded. Thus, for example, it can be advantageous to encode a first coarse version of the signal by using a representation mode based on an 8×8 transformation, and then to encode additional information using a 4×4 transformation.

The decoding of a representation by sub-passes of a raised quantification level is as follows:
   loop over the different sub-passes of the raised quantification level and, for each sub-pass:
      reading the information encoded in the sub-pass
      combination of the decoded information with the previously decoded information.

In one embodiment, as the information encoded in the different sub-passes is encoded with the current SVC syntax, their decoding is similar to the decoding of the information of a raised quality level, with the exception of reading the sub-pass index indicator and the last sub-pass indicator (information useful for identifying the relative order of decoding the different sub-passes).

According to the different variant embodiments proposed, different additional information can be read and used in the decoding process:
   information of the type of combination to be carried out between the different sub-passes (for example addition, substitution, concatenation with the series of coefficients previously encoded, etc). The inter-layer prediction fields currently present in SVC in the headers of blocks, groups of blocks and groups of groups of blocks can be used again as they are in order to disassociate the additive combination mode with respect to the substitutive combination mode. In the case of the use of a combination mode of the concatenation type, the dynamics of the syntax elements used for controlling the combination mode are then extended in order to propose another alternative (the syntax element res_pred_flag which was encoded in one bit is therefore encoded in two bits in order to extend the possible number of combination modes).

In a particular embodiment, one of these combinations will be taken as a preferred combination, not therefore necessitating signalling of the type of combination used. For example, it is possible to envisage that only the additive combination mode is used.

A device for encoding an image or a sequence of images generates a data flow in the form of groups of blocks, at least one group of blocks grouping image blocks having a resolution and a quality level of identical quantification. The device comprises at least the means, for the at least one group of blocks, of a. a first encoding adapted so that each block of the at least one group of blocks has at least one associated parameter that is given a value, and
   b. a second encoding adapted for giving a value to the associated parameter for at least one block of the at least one group of blocks,
   so that for the at least one block, the first and second values given for said parameter can be combined during decoding in order to provide a value assigned to said parameter.

For decoding an image or a sequence of images originating from a data flow in the form of groups of blocks, at least one group of blocks grouping image blocks having a resolution and a quality level of identical quantification, generated by the sub-passes encoding method, a decoding device comprises at least the means, for the at least one group of blocks, of a. a first decoding of the values given by the first encoding for the associated parameter for each block of the group of blocks, and
   b. a second decoding of the values given by the second encoding for at least one block of the group of blocks,
   so that the value assigned to each block of the group of blocks for this parameter is a combination of the values decoded for the latter by the first and second decoding.

The data flow thus encoded is transmitted by a transmission signal.

The latter is such that a group of blocks header furthermore comprises information indicating the type of combination to be carried out between the values given by the different encoding steps.

Figure 8:
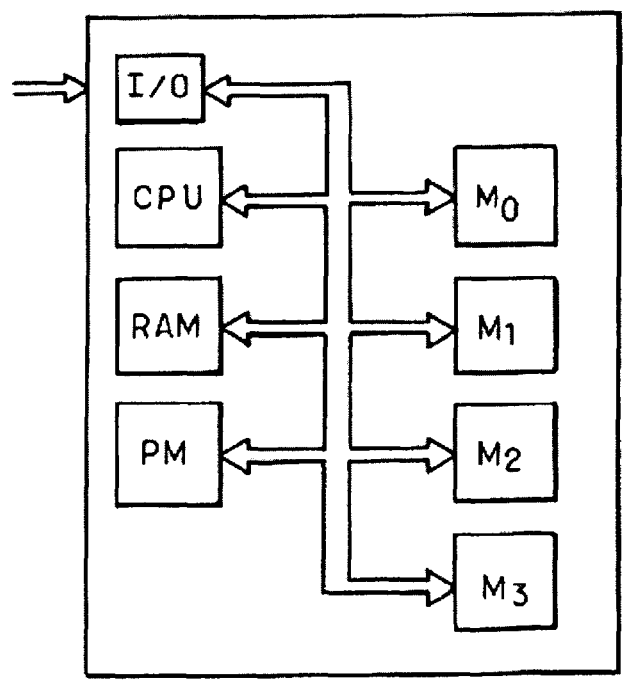
FIG. 8 is a block diagram of a computer on which a computer program for the implementation of the encoding method according to an embodiment of the invention can be executed.

It is understood that the encoding method can be used by a computer program product that can be downloaded from a communications network and/or recorded on a medium that can be read by a computer and/or that can be executed by a processor such as shown in FIG. 8 and comprising a central processing unit CPU, various RAM memories and registers M0, M1, M2, M3 as well as Inputs/Outputs I/O.

APPENDIX 1

Syntax elements of the Joint Document 6 (Draft SVC Standard) Slice Layer in Scalable Extension Syntax A syntax for the invention is proposed below, based on the existing syntax of Joint Document 6

The new fields are shown highlighted and in bold.

| | C | Descriptor |
|---|---|---|
| slice_header_in_scalable_extension( ) { | | |
|   first_mb_in_slice | 2 | ue(v) |
|   slice_type | 2 | ue(v) |
|   if( slice_type = = PR) { | | |
|     fragmented_flag | 2 | u(1) |
|     if( fragmented_flag = = 1 ) { | | |
|       fragment_order | 2 | ue(v) |
|       if ( fragment_order != 0) | | |
|         last_fragment_flag | 2 | u(1) |
|     } | | |
|     if( fragment_order = = 0 ) { | | |
|       num_mbs_in_slice_minus1 | 2 | ue(v) |
|       luma_chroma_sep_flag | 2 | u(1) |
|     } | | |
|   } | | |
|   Else { | | |
|     sub_quality_level_idx | 2 | ue(v) |
|     last_sub_quality_level_flag | 2 | u(1) |
|   } | | |
|   if( slice_type != PR | | fragment_order = = 0 ) { | | |

| | | |
|---|---|---|
| pic_parameter_set_id | 2 | ue(v) |
| frame_num | 2 | u(v) |
| if( !frame_mbs_only_flag ) { | | |
|   field_pic_flag | 2 | u(l) |
|   if( field_pic_flag) | | |
|     bottom_field_flag | 2 | u(l) |
| } | | |
| if( nal_unit_type = = 21 ) | | |
|   idr_pic_id | 2 | ue(v) |
| if( pic_order_cnt_type = = 0 ) { | | |
|   pic_order_cnt_lsb | 2 | u(v) |
|   if( pic_order_present_flag && !field_pic_flag ) | | |
|     delta_pic_order_cnt_bottom | 2 | se(v) |
| } | | |
| if( pic_order_cnt_type = = 1 && !delta_pic_order_always_zero_flag ) { | | |
|   delta_pic_order_cnt[ 0 ] | 2 | se(v) |
|   if( pic_order_present_flag && !field_pic_flag ) | | |
|     delta_pic_order_cnt[ 1 ] | 2 | se(v) |
| } | | |
| } | | |
| if( nal_ref_idc != 0 ) | | |
|   key_pic_flag | 2 | u(l) |
| if( slice_type != PR ) { | | |
|   if( redundant_pic_cnt_present_flag ) | | |
|     redundant_pic_cnt | 2 | ue(v) |
|   if( slice_type = = EB ) | | |
|     direct_spatial_mv_pred_flag | 2 | u(l) |
|   base_id_plus1 | 2 | ue(v) |
|   if( base_id_plus1 !=0) { | | |
|     adaptive_prediction_flag | 2 | u(l) |
|   } | | |
|   if( slice_type = = EP | | slice_type = = EB ) { | | |
|     num_ref_idx_active_override_flag | 2 | u(l) |
|     if( num_ref_idx_active_override_flag) { | | |
|       num_ref_idx_l0_active_minus1 | 2 | ue(v) |
|       if( slice_type = = EB ) | | |
|         num_ref_idx_l1_active_minus1 | 2 | ue(v) |
|     } | | |
|   } | | |
|   ref_pic_list_reordering( ) | 2 | |
|   if( ( weighted_pred_flag && slice_type = = EP ) | | | | |
|     ( weighted_bipred_idc = = 1 && slice_type = = EB ) ) { | | |
|     if( adaptive_prediction_flag) | | |
|       base_pred_weight_table_flag | 2 | u(l) |
|     if( base_pred_weight_table_flag = = 0 ) | | |
|       pred_weight_table( ) | | |
|   } | | |
|   if( nal_ref_idc != 0 ) { | | |
|     dec_ref_pic_marking( ) | 2 | |
|     if ( key_pic_flag && nal_unit_type != 21 ) | | |
|       dec_ref_pic_marking_base( ) | | |
|   } | | |
|   if( entropy_coding_mode_flag && slice_type != EI ) | | |
|     cabac_init_idc | 2 | ue(v) |
| } | | |
| if( slice_type != PR | | fragment_order = = 0 ) { | | |
|   slice_qp_delta | 2 | se(v) |
|   if( deblocking_filter_control_present_flag) { | | |
|     disable_deblocking_filter_idc | 2 | ue(v) |
|     if( disable_deblocking_filter_idc != 1 ) { | | |
|       slice_alpha_c0_offset_div2 | 2 | se(v) |
|       slice_beta_offset_div2 | 2 | se(v) |
|     } | | |
|   } | | |
| } | | |
| if( slice_type != PR ) | | |
|   if( num_slice_groups_minus1 > 0 && | | |
|     slice_group_map_type >= 3 && slice_group_map_type <= 5) | | |
|     slice_group_change_cycle | 2 | u(v) |
| if( slice_type != PR && extended_spatial_scalability > 0 ) { | | |
|   if ( chroma_format_idc > 0 ) { | | |
|     base_chroma_phase_x_plus1 | 2 | u(2) |
|     base_chroma_phase_y_plus1 | 2 | u(2) |
|   } | | |
|   if( extended_spatial_scalability = = 2 ) { | | |
|     scaled_base_left_offset | 2 | se(v) |
|     scaled_base_top_offset | 2 | se(v) |
|     scaled_base_right_offset | 2 | se(v) |
|     scaled_base_bottom_offset | 2 | se(v) |
|   } | | |

```
}
if( slice_type = = PR && fragment_order = =0) {
    adaptive_ref_fgs_flag                              2    u(l)
    if( adaptive_ref_fgs_flag) {
        max_diff_ref_scale_for_zero_base_block         2    u(5)
        max_diff_ref_scale_for_zero_base_coeff         2    u(5)
        fgs_entropy_order_flag                         2    u(l)
    }
    motion_refinement_flag                             2    u(l)
}
SpatialScalabilityType = spatial_scalability_type( )
}
```

The invention claimed is:

1. A method for encoding an image or a sequence of images generating a data flow in the form of groups of blocks, at least one group of blocks grouping image blocks having a resolution and a quality level of identical quantification, wherein said method comprises, for encoding of the group of blocks at said resolution and quality level, at least the following steps, for the at least one group of blocks, of
a first sub-pass corresponding to a first encoding step adapted to generate, for each block of the at least one group of blocks, coded data that is useful for a prediction at a higher quality level, and
a second sub-pass corresponding to a second encoding step adapted to generate coded data that is not useful for a prediction at the higher quality level,
so that for said at least one block, the coded data generated at the first and second sub-passes can be combined during decoding in order to decode said group of said block.

2. The encoding method according to claim 1, wherein the data coded at the first and second sub-passes can be combined so that the combination corresponds to an addition of the latter.

3. The encoding method according to claim 1, wherein the data coded at the first and second sub-passes can be combined so that the combination corresponds to a substitution of the value given by the first encoding by the value given by the second encoding.

4. The encoding method according to claim 1, wherein, as the groups of blocks of the data flow have a hierarchic structure of data layers nested in n successive levels, where n is an integer, each of said layers corresponding to a predetermined resolution and range of quality levels of said groups of blocks so that the resolution and/or the encoding quality level increases as the order of layers increases, at least one layer n+1 is encoded by prediction from the lower layer n, the encoding by prediction of the higher layer using only data coded at the first sub-pass.

5. The encoding method according to claim 1, wherein it furthermore comprises at least a third sub-pass corresponding to a third encoding step to generate coded data, so that, for said at least one block, the data coded at the first, second and third sub-passes can be combined during decoding in order to decode said block.

6. A device for decoding an image or a sequence of images originating from a data flow in the form of groups of blocks, at least one group of blocks grouping image blocks having a resolution and a quality level of identical quantification, said flow having been generated by the encoding method according to claim 1, wherein said device comprises, for decoding of the group of blocks at said resolution and quality level, at least the means, for the at least one group of blocks, of
a first decoding of the data coded at the first sub-pass, and
a second decoding of the data coded at the second sub-pass,
wherein, for at least one block of the group of blocks, decoding of the block at said resolution and quality level is obtained by combining data decoded by the first and second decoding means.

7. A method for decoding an image or a sequence of images originating from a data flow in the form of groups of blocks, at least one group of blocks grouping image blocks having a resolution and a quality level of identical quantification, said flow having been generated by the encoding method according to claim 1, wherein said decoding method comprises, for decoding of the group of blocks at said resolution and quality level, at least the following steps, for the at least one group of blocks, of
a first decoding of the data coded at the first sub-pass, and
a second decoding of data coded at the second sub-pass,
wherein, for at least one block of the group of blocks, decoding of the block at said resolution and quality level is obtained by combining data decoded at the first decoding and at the second decoding.

8. A device for encoding an image or a sequence of images generating a data flow in the form of groups of blocks, at least one group of blocks grouping image blocks having a resolution and a quality level of identical quantification, wherein said device comprises, for encoding of the group of blocks at said resolution and quality level, at least the means, for the at least one group of blocks, of
a first encoding adapted to generate coded data that is useful for a prediction at a higher quality level, and
a second encoding adapted to generate coded data that is not useful for a prediction at the higher quality level,
so that for said at least one block, the data coded by the first and second encoding means can be combined during decoding in order to decode said block.

9. A non-transitory computer-readable storage medium, with an executable program stored thereon, wherein the program comprises program code instructions for the implementation of a method for encoding an image or a sequence of images generating a data flow in the form of groups of blocks, at least one group of blocks grouping image blocks having a resolution and a quality level of identical quantification, wherein said method comprises, for encoding of the group of blocks at said resolution and quality level, at least the following steps, for the at least one group of blocks, of
a first sub-pass corresponding to a first encoding step adapted so that to generate, for each block of the at least one group of blocks, coded data that is useful for a prediction at a higher quality level, and
a second sub-pass corresponding to a second encoding step adapted to generate coded data that is not useful for a prediction at the higher quality level,
so that for said at least one block, the coded data generated at the first and second sub-passes can be combined during decoding in order to decode said group of said block.

* * * * *